UNITED STATES PATENT OFFICE.

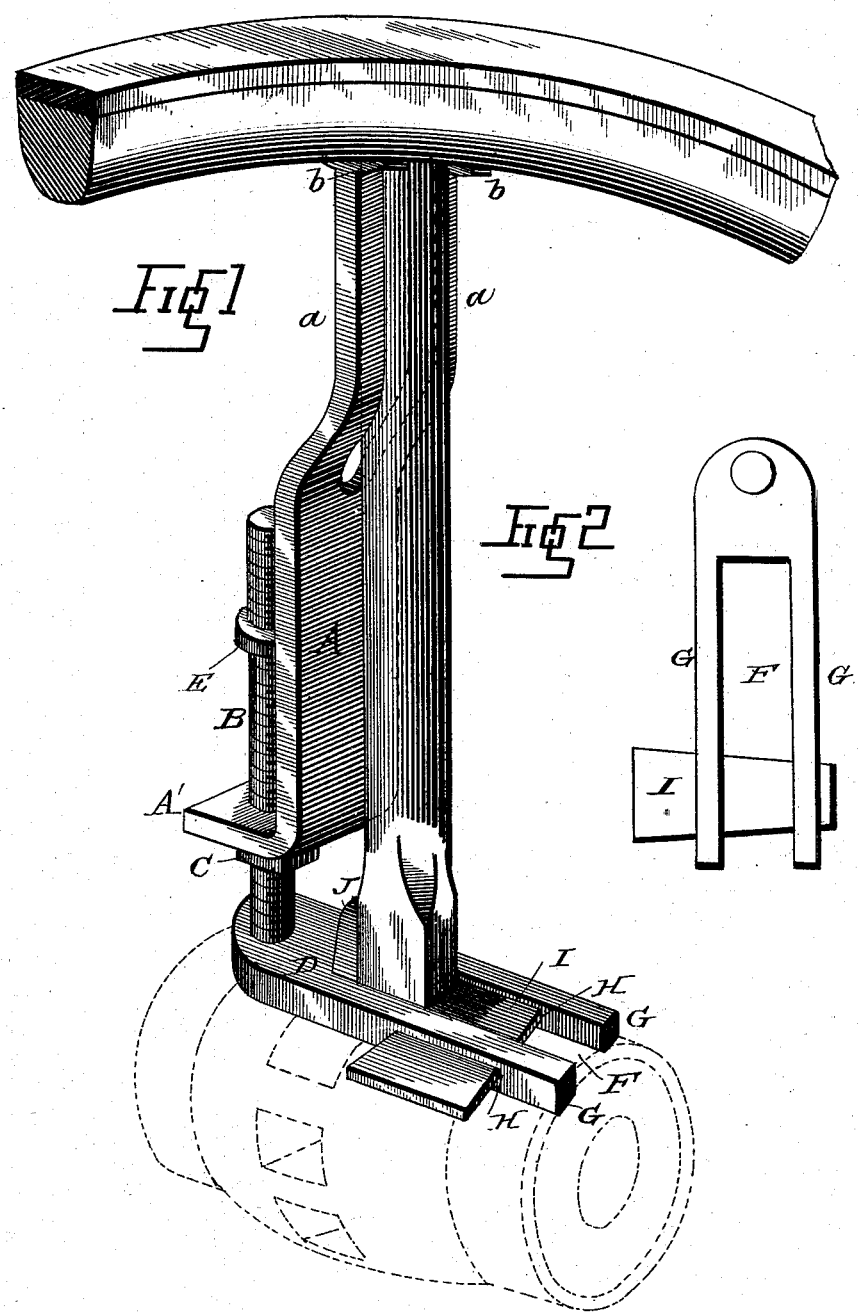

JESSEE B. CYPERT, OF WAYNESBOROUGH, TENNESSEE.

TIRE-TIGHTENER.

SPECIFICATION forming part of Letters Patent No. 274,179, dated March 20, 1883.

Application filed January 15, 1883. (No model.)

*To all whom it may concern:*

Be it known that I, JESSEE B. CYPERT, of Waynesborough, in the county of Wayne and State of Tennessee, have invented certain new and useful Improvements in Tire-Tighteners; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved tire-tightener, and Fig. 2 is a top view of the lower part of the same.

Similar letters of reference indicate corresponding parts in both the figures.

My invention contemplates an improvement upon my tire-tightener for which Letters Patent No. 262,010, were granted to me on the 1st day of August, 1882; and it consists in the improved construction and combination of parts of the plate bearing against the hub, and its combination with the several parts of the device, as hereinafter more fully described and claimed.

In the accompanying drawings, the letter A indicates the staff or brace, *a a* the feet, *b b* the shoes, A' the lower bent part, B the screw, C the nut, and E the guide-collar, all of which parts are described and shown in the above-mentioned Letters Patent, and need no further explanation. To the lower end of screw B is fastened a plate, D, which is slotted at F, forming two parallel arms, G G. The outer ends of these arms have slots H H, through which a wedge, I, passes.

When the tightener is to be used the shoes *b b* are placed against the fellies, straddling the spoke, which is to be provided with a washer to expand the wheel. The plate D is placed against the hub, the arms G G straddling the spoke, whereupon the wedge I is placed into the slots H. Another wedge, J, is now placed with its base resting upon the hub and between the inner side of the slot F and the edge of the spoke. The wedge I is then driven in, clamping the lower part of the spoke tight, and by screwing upon the nut C, so as to expand the device, the wedge J is driven further in, clamping the spoke firmly and preventing it from being drawn out of its socket in the hub, while the felly is raised enough to draw the outer end of the spoke out of its socket and insert a washer or packing.

Having thus described my invention, I claim and desire to secure by Letters Patent of the United States—

The tire-tightener consisting of the body A, having screw-threaded projection A' and bifurcated legs *a a*, provided with shoes *b b*, guide-collar E, screw B, nut C, slotted head D, having wedge I, and wedge J, all constructed and combined to operate substantially as and for the purpose shown and set forth.

In testimony that I claim the foregoing as my own I have hereunto affixed my signature in presence of two witnesses.

JESSEE B. CYPERT.

Witnesses:
 JOHN A. RAY,
 SAML. COLE.